Sept. 29, 1959             A. S. PAGE             2,906,545

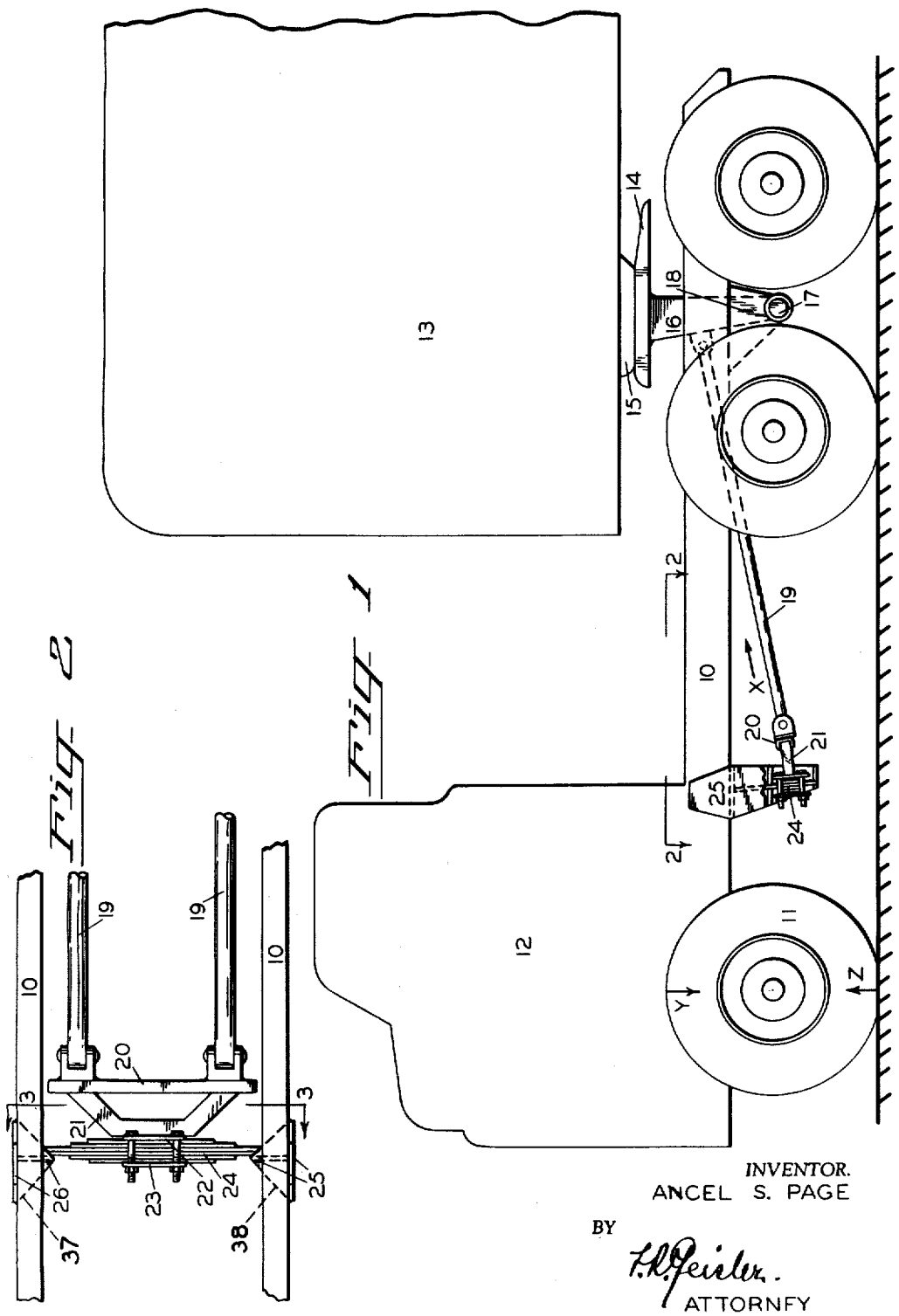

FIFTH WHEEL MOUNTING ASSEMBLY

Filed Jan. 24, 1958             2 Sheets-Sheet 2

INVENTOR.
ANCEL S. PAGE

BY T. R. Geisler
ATTORNEY

United States Patent Office 2,906,545
Patented Sept. 29, 1959

1

2,906,545

FIFTH WHEEL MOUNTING ASSEMBLY

Ancel S. Page, Portland, Oreg.

Application January 24, 1958, Serial No. 710,887

6 Claims. (Cl. 280—438)

This invention relates to the pivotal mounting for the front end of a trailer vehicle, generally known as a semi-trailer, on the rear of a truck or similar vehicle. Such a pivotal mounting is commonly referred to as the "fifth wheel" of the truck or leading vehicle, this term being used generally throughout the industry.

One of the familiar problems encountered when the front ends of trailers or semi-trailers are mounted on the rear of the truck or leading vehicle, and thus on the customary fifth wheel of the leading vehicle, is that the front end of the leading vehicle or truck has a tendency from time to time to be lifted slightly from the ground whenever a sudden or excessive pulling force is required to be exerted by the truck. As a result, when a heavily loaded semi-trailer, having its front end supported on the customary fifth wheel at the rear of the truck, is being pulled by the truck over a road which is rough, or which has frequent changes in grade, the driver of the truck, located in the usual cab positioned at the front end of the truck, is subjected to considerable up and down vibration apart from that transmitted merely from the front wheels of the truck. This additional up and down vibration becomes very fatiguing to drivers making long hauls under such conditions and is known to be a source of frequent complaints.

A main object of the present invention is to eliminate substantially this tendency for the front end of the truck to be lifted slightly or caused to vibrate up and down as the result of sudden forward pulls on the semi-trailer exerted by the truck.

A related and more specific object of the invention is to provide an improved fifth wheel mounting on the rear of a truck, for supporting the front end of a semi-trailer or similar vehicle, through which fifth wheel mounting a sudden forward pull on the part of the truck will cause a force to be exerted in a downward direction on the front end of the truck in place of the customary tendency to lift the front end of the truck, and thus reduce the up and down vibrations to which the driver of the truck would otherwise be subjected.

An additional object of the invention is to provide a novel and improved fifth wheel mounting assembly which will be simple and practical in construction and which can readily be used in place of the heretofore customary fifth wheel for supporting the front end of a semi-trailer or similar vehicle.

The manner in which these objects and other incidental advantages are attained with the present invention and the construction and manner of operation of the fifth wheel mounting assembly of the present invention will be readily understood from the following brief description with reference to the accompanying drawings.

In the drawings:

Fig. 1 is an elevation of the fifth wheel assembly showing the same mounted on a truck, the truck and the front end of the attached semi-trailer being shown more or less diagrammatically;

2

Fig. 2 is a fragmentary plan view taken on line 2—2 of Fig. 1;

Figure 4:
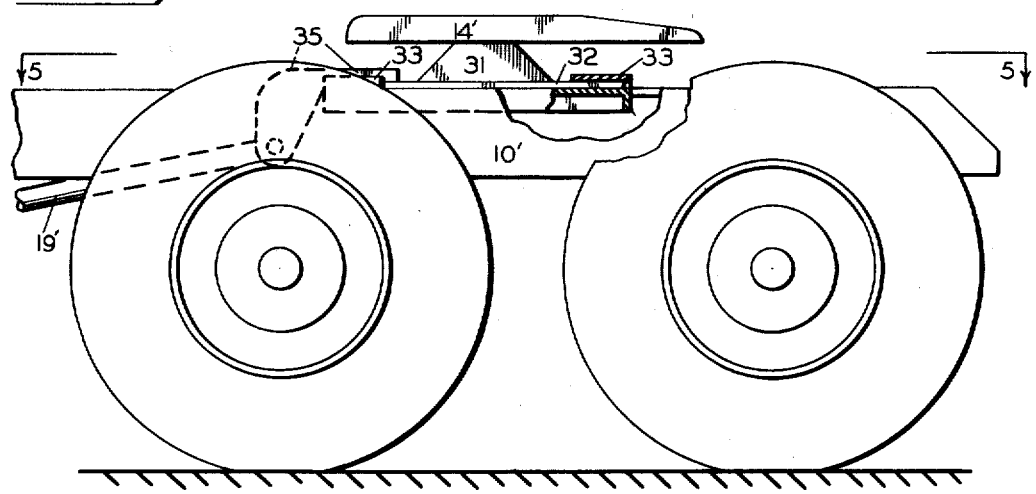
Fig. 4 is a fragmentary elevation showing a modified way in which the turntable plate of the fifth wheel may be supported in the fifth wheel assembly of the invention.

Referring first to Fig. 1 wherein the reference character 10 indicates the truck frame, 11 indicates the front wheels of the truck, 12 the driver's cab at the front of the truck, and 13 the semi-trailer, the front end of which is supported on the rear of the truck 10, the fifth wheel assembly includes the usual main turntable plate 14 which supports a companion turntable plate 15 secured on the bottom of the semi-trailer 13. The plate 15 of the semi-trailer is removably secured to and so arranged as to swivel on the fifth plate 14 by suitable means (not shown), such arrangement being old and well known in the industry and need not be further described here and the means by which the plates 14 and 15 are attached forms no part of the present invention.

The plate 14 of the fifth wheel assembly is secured to the upper ends of a pair of identical, upwardly-extending arms 16, one of which is shown in Fig. 1, and which are located inside the longitudinal main side frame members of the truck respectively. These arms 16 in turn are pivotally mounted on a shaft 17, the ends of which shaft are supported in a pair of brackets 18 respectively, one of which brackets is shown in Fig. 1, and these brackets 18 are rigidly secured to and preferably extend downwardly from the longitudinal side frame members of the truck respectively.

A pair of identical rods 19, one of which is shown in Fig. 1 and the forward ends of which are shown in Fig. 2, are pivotally connected to the arms 16 respectively and extend forwardly and downwardly from their pivotal connections with the arms 16. The front ends of these rods 19 are pivotally connected to a transversely-extending cross head 20, which is shown more fully in Fig. 2. This cross head 20 includes a yoke member 21 formed with a clamping plate 22, and the cross head 20 is secured to a leaf spring assembly 24 by means of clamping bolts which connect the clamping plate 22 with a companion clamping plate 23 on the opposite side of the leaf spring assembly 24.

Figure 3:
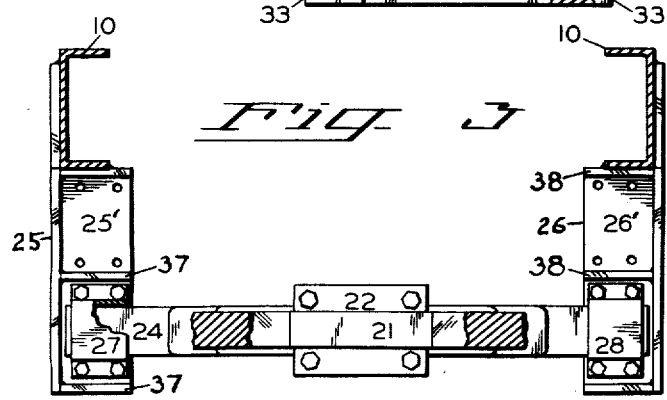
Fig. 3 is a sectional elevation taken on line 3—3 of Fig. 2.

The leaf spring assembly 24 is supported at its opposite ends in a pair of brackets 25 and 26 which are secured to and extend downwardly from the longitudinal side members of the truck frame 10 respectively. The ends of the leaf spring assembly 24 are adjustably held in the respective brackets 25 and 26 by U-shaped mounting plates 27 and 28 (Fig. 3) which are bolted to the vertical flanges 25' and 26' of the downwardly-extending brackets 25 and 26. The brackets 25 and 26 are preferably formed with horizontal webs 37 and 38 and the vertical flanges 25' and 26' are provided with a plurality of bolt holes for securing the mounting plates 27 and 28, thus enabling the spring assembly 24 to be adjusted vertically if desired.

As indicated in Fig. 1, the brackets 25 and 26 are located near the front end of the truck while the pivotally mounted arms 16, which support the fifth wheel turntable plate 14 are of course located near the rear of the truck. It will be evident that a thrust on the plate 14 in a rearward direction, and thus a thrust caused by a pull by the semi-trailer 13 or a forward thrust by the truck 10, will produce a pull on the rods 19 in a rearward direction as indicated by the arrow X in Fig. 1. However, since the forward ends of these rods 19 are connected with the brackets 25 and 26 at points located below the main frame of the truck and near the front end of the truck, such a pull in the direction indicated by the arrow X will cause a force to be exerted in a downward direction on the front end of the truck and on the front wheels, as indicated by the arrow Y in Fig. 1, in contrast to the force which would be exerted in the opposite direction (as indicated by the arrow Z in Fig. 1) if the fifth wheel turntable 14 were rigidly secured on the rear of the truck as has been customary heretofore. Consequently in this way the exertion of any sudden pulling force by the truck results in holding the front wheels of the truck more firmly down on the roadbed instead of producing the customary and objectionable slight upward movement or vibration of the forward end of a truck which has been found so fatiguing to drivers on long hauls over rough roads. Furthermore, sudden rearward pulls on the rods 19 will also be cushioned to some extent in being transmitted through the medium of the spring assembly 24 so that the driver in the cab of a truck, in addition to being relieved from the undesirable and fatiguing upward thrusts on the front end of a truck, finds the resulting cushioned thrust, expended downwardly on the front wheels, substantially if not entirely imperceptible.

Figure 5:
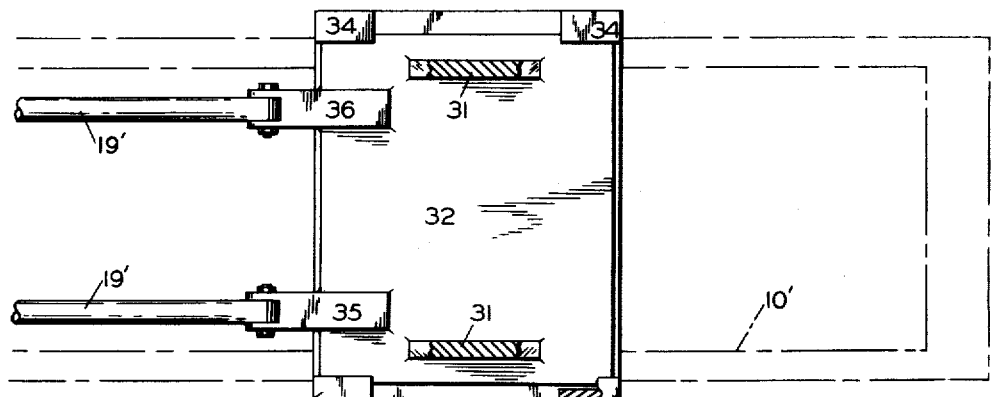
Fig. 5 is a section on line 5—5 of Fig. 4.

In the modified form of the invention shown in Figs. 4 and 5, the main turntable plate 14' of the fifth wheel assembly, instead of being carried on pivotally supported arms, is mounted by means of a pair of supporting brackets 31 on a slidable plate 32. The plate 32 is slidably mounted in a pair of guide ways 33 and 34 secured on the longitudinal side frame members of the truck 10' respectively, thus enabling the plate 32 to move in a direction parallel to the longitudinal axis of the truck.

A pair of bracket arms 35 and 26 are rigidly secured to the plate 32 and extend forwardly therefrom. A pair of rods 19', similar to the rods 19 previously described with reference to Figs. 1 and 2, have their rear ends pivotally connected to the bracket arms 35 and 36 respectively. The forward ends of these rods 19 are connected to a cross head and leaf spring assembly identical to that previously described and identically mounted near the front of the truck and below the main frame.

It will be apparent that the rearward pull on the plate 14' of this modified fifth wheel assembly will produce a rearward pull on the rods 19' and consequently result similarly in a cushioned downward thrust on the front end of the truck, in place of the objectionable upward thrusting tendency which heretofore has been so common.

Minor modifications might be made in either of the constructions described while still enabling a sudden rearward pull on the fifth wheel turntable plate at the rear of the truck to be converted into the desired downward thrust at the front of the truck, instead of an upward thrust, and thus without departing from the principle of the invention.

I claim:

1. In a vehicle of the character described, a fifth wheel mounting assembly including a main fifth wheel, movable support means on the vehicle for said fifth wheel so arranged as to enable said fifth wheel to move in a direction parallel to the longitudinal axis of said vehicle, means controlling the movement of said fifth wheel with respect to said vehicle, said latter mentioned means connected with said fifth wheel and extending forwardly and downwardly therefrom and terminating a substantial distance below the main frame of said vehicle, securing means on said vehicle for the front end of said controlling means, said securing means positioned considerably nearer to the front end than to the rear end of said vehicle and extending below the main frame of said vehicle, whereby the rearward pull on said fifth wheel will cause a thrust in a downward direction to be exerted at the front of said vehicle.

2. In a vehicle of the character described, a fifth wheel mounting assembly including a main fifth wheel plate, movable support means on the vehicle for said fifth wheel plate so arranged as to enable said fifth wheel plate to move in a direction parallel to the longitudinal axis of said vehicle, means controlling the movement of said fifth wheel plate with respect to said vehicle, said latter mentioned means connected with said fifth wheel plate and extending downwardly and forwardly therefrom and terminating a substantial distance below the main frame of said vehicle, securing elements on said vehicle for the front end of said controlling means, said securing elements positioned considerably nearer to the front end than to the rear end of said vehicle and extending below the main frame of said vehicle, and a cushioning element in said controlling means, whereby a rearward pull on said fifth wheel plate will cause a cushioned thrust in a downward direction to be exerted at the front of said vehicle.

3. In a vehicle of the character described, a fifth wheel mounting assembly including a main fifth wheel turntable, a pair of pivotally mounted arms on the vehicle supporting said fifth wheel turntable, said arms pivotally mounted on said vehicle to swing in substantially vertical planes parallel to the longitudinal axis of said vehicle, whereby to enable said fifth wheel turntable to move in a direction substantially parallel to the longitudinal axis of said vehicle, a pair of rods connected with said fifth wheel turntable and extending forwardly and downwardly therefrom, a pair of brackets secured to side frame members of said vehicle considerably nearer to the front end of said vehicle than to the rear end and extending down below the main frame of said vehicle, and spring means located below said main frame and connecting the forward ends of said rods with said brackets, whereby a rearward pull on said fifth wheel turntable will cause a cushioned thrust in a downward direction to be exerted at the front of said vehicle.

4. In a vehicle of the character described, a fifth wheel mounting assembly consisting of a main plate, a pair of pivotally mounted arms on the vehicle supporting said plate, said arms pivotally mounted on said vehicle to swing in substantially vertical planes parallel to the longitudinal axis of said vehicle, whereby to enable said plate to move in a direction substantially parallel to the longitudinal axis of said vehicle, a pair of rods connected with said arms respectively and extending forwardly and downwardly therefrom, a pair of brackets secured to side frame members of said vehicle near the front end of said vehicle and extending down below the main frame of said vehicle, a transversely-extending leaf spring assembly carried in said brackets, and a yoke connecting the forward ends of said rods with said spring assembly, whereby a rearward pull on said plate will cause a cushioned thrust in a downward direction to be exerted at the front of said vehicle.

5. In a vehicle of the character described, a fifth wheel mounting assembly comprising a main fifth wheel turntable, a base plate slidably mounted on the vehicle for supporting said fifth wheel turntable, guide ways for said base plate on said vehicle so arranged as to enable said fifth wheel turntable to move in a direction parallel to the longitudinal axis of said vehicle, a pair of rods connected with said base plate and extending forwardly and downwardly therefrom, a pair of brackets secured to side frame members of said vehicle near the front end of said vehicle and extending down below the main frame of said vehicle, and spring means connecting the forward ends of said rods with said brackets, whereby a rearward pull on said fifth wheel turntable will cause a cushioned thrust in a downward direction to be exerted at the front of said vehicle.

6. In a vehicle of the character described, a fifth wheel mounting assembly consisting of a main fifth wheel for supporting the front end of a semi-trailer, a base plate slidably mounted on the vehicle for supporting said fifth wheel, guide ways for said base plate on said vehicle so arranged as to enable said base plate and said fifth wheel to move in a direction parallel to the longitudinal axis of said vehicle, a pair of rods connected with said base plate and extending forwardly and downwardly therefrom, a pair of brackets secured to side frame members of said vehicle near the front end of said vehicle and extending down below the main frame of said vehicle, a transversely-extending leaf spring assembly adjustably carried in said brackets, and a yoke connecting the forward ends of said rods with said spring assembly, whereby a rearward pull on said fifth wheel will cause a cushioned thrust in a downward direction to be exerted at the front of said vehicle.

References Cited in the file of this patent

UNITED STATES PATENTS

| | | |
|---|---|---|
| 1,267,561 | Lapham | May 28, 1918 |
| 2,391,372 | Weigand | Dec. 18, 1945 |
| 2,638,352 | Beachler | May 12, 1953 |